US011449820B2

(12) United States Patent
Zhao et al.

(10) Patent No.: US 11,449,820 B2
(45) Date of Patent: Sep. 20, 2022

(54) ELECTRONIC SIGNING METHOD AND APPARATUS

(71) Applicant: Beijing Jingdong Zhenshi Information Technology Co., Ltd., Beijing (CN)

(72) Inventors: Hongye Zhao, Beijing (CN); Yanchao Miao, Beijing (CN)

(73) Assignee: Beijing Jingdong Zhenshi Information Technology Co., Ltd., Beijing (CN)

(*) Notice: Subject to any disclaimer, the term of this patent is extended or adjusted under 35 U.S.C. 154(b) by 438 days.

(21) Appl. No.: 16/499,886

(22) PCT Filed: Mar. 23, 2018

(86) PCT No.: PCT/CN2018/080264
§ 371 (c)(1),
(2) Date: Oct. 1, 2019

(87) PCT Pub. No.: WO2018/196523
PCT Pub. Date: Nov. 1, 2018

(65) Prior Publication Data
US 2020/0118070 A1    Apr. 16, 2020

(30) Foreign Application Priority Data

Apr. 27, 2017   (CN) .......................... 201710287832.X

(51) Int. Cl.
*G06F 21/64*      (2013.01)
*G06Q 10/08*      (2012.01)
(Continued)

(52) U.S. Cl.
CPC ......... *G06Q 10/0832* (2013.01); *G06F 21/64* (2013.01); *G06Q 10/083* (2013.01);
(Continued)

(58) Field of Classification Search
CPC .......... G06F 21/31; G06F 21/34; G06F 21/64; G06Q 10/083; G06Q 2220/00
See application file for complete search history.

(56) References Cited

U.S. PATENT DOCUMENTS 7,458,612 B1     12/2008  Bennett
9,699,606 B1 *    7/2017  Bhatia ................. G06Q 10/083
(Continued)

FOREIGN PATENT DOCUMENTS

CN        103810584 A      5/2014
CN        103870947 A      6/2014
(Continued)

OTHER PUBLICATIONS

International Search Report and Written Opinion for International Application No. PCT/CN2018/080264, dated Jun. 14, 2018, 6 pages.

*Primary Examiner* — David J Pearson
(74) *Attorney, Agent, or Firm* — RatnerPrestia

(57) ABSTRACT

Disclosed are an electronic signing method and apparatus. One specific embodiment of the method comprises: in response to the reception of a signing request, acquiring the located current address information and a to-be-signed electronic signature picture comprising delivery address information; converting the current address information into first longitude and latitude data, and converting the delivery address information into second longitude and latitude data; determining the distance between the current address information and the delivery address information; if the distance is greater than a pre-set threshold value, sending a first verification code to a terminal of a user who is to receive goods, and receiving a second verification code input by a user based on the first verification code; and in response to the determination that the second verification code is con-
(Continued)

sistent with the first verification code, receiving signature data input by the user on the electronic signature picture.

17 Claims, 5 Drawing Sheets

(51) Int. Cl.
*H04W 4/029* (2018.01)
*H04L 9/32* (2006.01)

(52) U.S. Cl.
CPC ....... *G06Q 10/0833* (2013.01); *H04L 9/3228* (2013.01); *H04L 9/3234* (2013.01); *H04L 9/3247* (2013.01); *H04W 4/029* (2018.02); *G06Q 2220/00* (2013.01)

(56) References Cited

U.S. PATENT DOCUMENTS

| | | | |
|---|---|---|---|
| 2003/0189090 | A1 | 10/2003 | Holden |
| 2014/0074746 | A1* | 3/2014 | Wang .................... G06Q 10/083 705/341 |
| 2014/0351163 | A1* | 11/2014 | Tussy .................... G06Q 10/083 705/330 |
| 2015/0199643 | A1* | 7/2015 | Hubner .............. G06Q 10/0833 705/333 |
| 2015/0262123 | A1* | 9/2015 | Sharma .............. G06Q 10/0833 705/333 |

FOREIGN PATENT DOCUMENTS

| | | |
|---|---|---|
| CN | 103955813 A | 7/2014 |
| CN | 104240050 A | 12/2014 |
| CN | 106022673 A | 10/2016 |
| CN | 106485436 A | 3/2017 |

* cited by examiner

ELECTRONIC SIGNING METHOD AND APPARATUS

CROSS-REFERENCE TO RELATED APPLICATIONS

This application is a national stage of International Application No. PCT/CN2018/080264, filed on Mar. 23, 2018, which claims priority to Chinese Patent Application No. 201710287832.X filed on Apr. 27, 2017, the contents of each of which are incorporated herein by reference in their entireties.

TECHNICAL FIELD

The present disclosure relates to the field of logistics technology, specifically to the field of delivery technology, and more specifically to an electronic signing method and apparatus.

BACKGROUND

At present, in the logistics delivery link, when a customer receives goods, he needs to sign an electronic logistics order on a terminal device. The electronic logistics order is stored in cloud in the form of a picture. Electronic signing is high-tech, simple and cost-saving, but has the following shortcomings: first, it is difficult to confirm others' signing instead of the consignee and specific signing locations, the others' signing occurs from time to time after the courier delivers goods, and huge economic loss is caused to the distributor in the event of a dispute. Second, the electronic logistics order contains sensitive information such as customer address information and phone number. Because the existing electronic logistics order signing picture displays and stores user's sensitive information such as phone number and address information by plain text, when the account and password of a person who has the right to view the signing picture leak, a criminal may freely inquire the order picture, resulting in leakage of the customer's telephone information or address information.

SUMMARY

An objective of the present disclosure is to provide an improved electronic signing method and apparatus to solve the technical problems mentioned in the Background part.

In a first aspect, the embodiments of the present disclosure provide an electronic signing method, including: in response to receiving a signing request, acquiring located current address information and a to-be-signed electronic signature picture, the electronic signature picture including delivery address information; converting the current address information into first longitude and latitude data, and converting the delivery address information into second longitude and latitude data; determining a distance between a geographical location corresponding to the current address information and a geographical location corresponding to the delivery address information based on the first longitude and latitude data and the second longitude and latitude data; sending, if the distance is greater than a pre-set threshold, a first verification code to a terminal of a user who is to receive goods, and receiving a second verification code inputted by the user based on the first verification code; and receiving, in response to determining that the second verification code is consistent with the first verification code, signature data inputted by the user on the electronic signature picture.

In some embodiments, the electronic signature picture further includes an express number; and the method further includes: encrypting the first latitude and longitude data, the express number, and the first verification code to generate a cipher text; generating a two-dimensional code based on the cipher text, and adding the two-dimensional code to the electronic signature picture including the signature data.

In some embodiments, the method further includes: receiving, if the distance is smaller than or equal to the pre-set threshold, signature data inputted by the user who is to receive goods on the electronic signature picture.

In some embodiments, the electronic signature picture further includes an express number; and the method further includes: encrypting the first latitude and longitude data and the express number to generate a cipher text; generating a two-dimensional code based on the cipher text, and adding the two-dimensional code to the electronic signature picture including the signature data.

In some embodiments, the method further includes: acquiring, in response to receiving a query request, the 23 electronic signature picture including the two-dimensional code; scanning the two-dimensional code to obtain the cipher text, parsing the first latitude and longitude data, the express number, and the first verification code from the cipher text, converting the first latitude and longitude data into the current address information, and then outputting the current address information, the express number, and the first verification code.

In some embodiments, before parsing the first latitude and longitude data, the express number, and the first verification code from the cipher text, the method further includes: sending a third verification code to the terminal of the user; receiving a fourth verification code inputted by the user based on the third verification code; determining whether the fourth verification code is consistent with the third verification code; and parsing, if the fourth verification code is consistent with the third verification code, the first latitude and longitude data, the express number, and the first verification code from the cipher text.

In some embodiments, the method further includes: replacing the delivery address information and a consignee's phone number on the electronic signature picture including the signature data with preset characters.

In some embodiments, the encrypting the first latitude and longitude data, the express number, and the first verification code to generate a cipher text includes: encrypting the first latitude and longitude data and the express number by using the first verification code as a key to generate the cipher text.

In some embodiments, the parsing the first latitude and longitude data, the express number, and the first verification code from the cipher text includes: receiving a fifth verification code inputted by the user based on the first verification code; and parsing the first latitude and longitude data, the express number, and the first verification code from the cipher text by using the fifth verification code as a decryption key.

In a second aspect, the embodiments of the present disclosure provide an electronic signing apparatus, including: an acquisition unit, configured to acquire, in response to receiving a signing request, the located current address information and a to-be-signed electronic signature picture, the electronic signature picture including delivery address information; a conversion unit, configured to convert the current address information into first longitude and latitude data, and convert the delivery address information into second longitude and latitude data; a ranging unit, configured to determine a distance between a geographical location corresponding to the current address information and a geographical location corresponding to the delivery address information based on the first longitude and latitude data and the second longitude and latitude data; a sending unit, configured to send, if the distance is greater than a pre-set threshold, a first verification code to a terminal of a user who is to receive goods, and receive a second verification code inputted by the user based on the first verification code; and a signing unit, configured to receive, in response to determining that the second verification code is consistent with the first verification code, signature data inputted by the user on the electronic signature picture.

In some embodiments, the electronic signature picture further includes an express number; and the apparatus further includes: an encryption unit, configured to encrypt the first latitude and longitude data, the express number, and the first verification code to generate a cipher text; and a generation unit, configured to generate a two-dimensional code based on the cipher text, and add the two-dimensional code to the electronic signature picture including the signature data.

In some embodiments, the signing unit is further configured to: receive, if the distance is smaller than or equal to the pre-set threshold, signature data inputted by the user who is to receive goods on the electronic signature picture.

In some embodiments, the electronic signature picture further includes an express number; and the apparatus further includes: an encryption unit, configured to encrypt the first latitude and longitude data and the express number to generate a cipher text; and a generation unit, configured to generate a two-dimensional code based on the cipher text, and add the two-dimensional code to the electronic signature picture including the signature data.

In some embodiments, the apparatus further includes: a query unit, configured to acquire, in response to receiving a query request, the electronic signature picture including the two-dimensional code; and a parsing unit, configured to scan the two-dimensional code to obtain the cipher text, parse the first latitude and longitude data, the express number, and the first verification code from the cipher text, convert the first latitude and longitude data into the current address information, and then output the current address information, the express number, and the first verification code.

In some embodiments, the sending unit is further configured to send a third verification code to the terminal of the user before the first latitude and longitude data, the express number, and the first verification code are parsed from the cipher text; and the parsing unit is further configured to receive a fourth verification code inputted by the user based on the third verification code, determine whether the fourth verification code is consistent with the third verification code, and parse, if the fourth verification code is consistent with the third verification code, the first latitude and longitude data, the express number, and the first verification code from the cipher text.

In some embodiments, the apparatus further includes: a replacement unit, configured to replace the delivery address information and the consignee's phone number on the electronic signature picture including the signature data with preset characters.

In some embodiments, the encryption unit is further configured to: encrypt the first latitude and longitude data and the express number by using the first verification code as a key to generate the cipher text.

In some embodiments, the parsing unit is further configured to: receive a fifth verification code inputted by the user based on the first verification code; and parse the first latitude and longitude data, the express number, and the first verification code from the cipher text by using the fifth verification code as a decryption key.

In a third aspect, the embodiments of the present disclosure provide a device, including: one or more processors; and a storage apparatus, configured to store one or more programs, where when the one or more programs are executed by the one or more processors, the one or more processors implement any method in the first aspect.

In a fourth aspect, the embodiments of the present disclosure provide a computer readable storage medium, storing a computer program thereon, wherein the computer program, when executed by a processor, implements the method in the first aspect.

According to the electronic signing method and apparatus provided by the embodiments of the present disclosure, the located current address information and delivery address information in a to-be-signed electronic signature picture are converted into latitude and longitude data for comparison, the distance between the two is determined, and if the distance exceeds a pre-set threshold, the identity of a user who is to receive goods needs to be verified by a verification code, thereby effectively preventing other's signing instead of the consignee, and avoiding the economic loss caused by the others' signing instead of the consignee; and the signing evidence is electronically stored to facilitate management and subsequent query.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and features in the embodiments may be combined with each other without conflicts. The present disclosure will be described in detail with reference to the accompanying drawings and embodiments.

Figure 1:
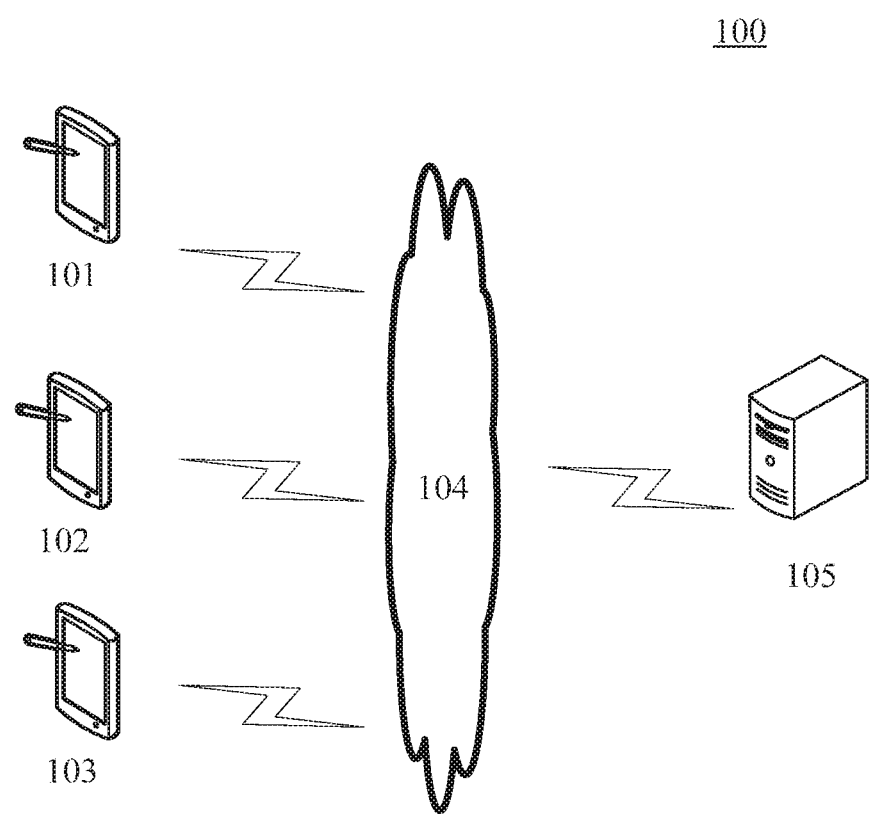
FIG. 1 is a diagram of an exemplary system architecture in which the present disclosure may be implemented.

FIG. 1 shows an exemplary system architecture 100 in which embodiments of an electronic signing method or an electronic signing apparatus according to the present disclosure may be implemented.

As shown in FIG. 1, the system architecture 100 may include terminal devices 101, 102 and 103, a network 104, and a server 105. The network 104 serves as a medium providing a communication link between the terminal devices 101, 102 and 103 and the server 105. The network 104 may include various connection types, such as wired or wireless communication links or optical fibers.

A user may interact with the server 105 by using the terminal device 101, 102 or 103 through the network 104 to receive or send messages, etc. Various communication client applications, such as picture browser applications, short message tools, shopping applications, search applications, instant messaging tools, mailbox clients and social platform software, may be installed on the terminal devices 101, 102 and 103.

The terminal devices 101, 102 and 103 may be various electronic devices having display screens and supporting the functions of handwriting entry and positioning, including but not limited to a smart phone, a tablet computer, an e-book reader, an MP3 (Moving Picture Experts Group Audio Layer III) player, an MP4 (Moving Picture Experts Group Audio Layer IV) player, etc.

The server 105 may be a server for providing various services, for example, an electronic signature picture server for 23 providing a support for an electronic signature picture displayed on the terminal device 101, 102 or 103. The electronic signature picture server may store the received data such as the signed electronic signature picture, and feed back the stored signed electronic signature picture to the terminal device after receiving a query request.

It should be noted that the electronic signing method provided by the embodiments of the present disclosure is generally executed by the terminal device 101, 102 or 103. Accordingly, the electronic signing apparatus is generally provided in the terminal device 101, 102 or 103.

It should be appreciated that the numbers of the terminal devices, the network and the server in FIG. 1 are merely illustrative. Any number of terminal devices, networks and servers may be provided based on actual requirements.

Figure 2:
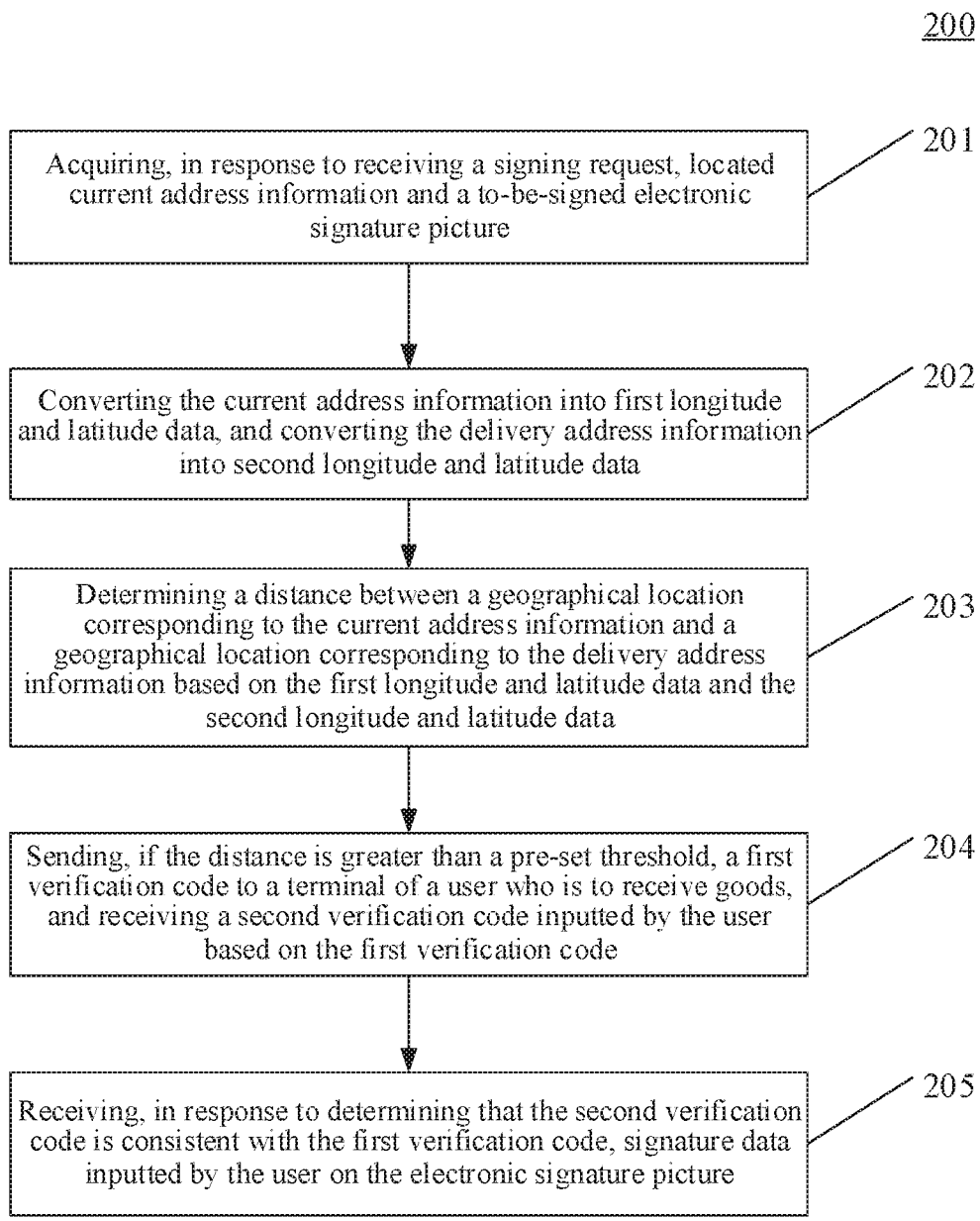
FIG. 2 is a flowchart of an embodiment of an electronic signing method according to the present disclosure.

Referring to FIG. 2, a process 200 of an embodiment of an electronic signing method according to the present disclosure is shown. The electronic signing method includes the following steps.

Step 201, in response to receiving a signing request, located current address information and a to-be-signed electronic signature picture are acquired.

In this embodiment, an electronic device (e.g., the terminal device shown in FIG. 1) on which the electronic signing method is performed may receive a signing request inputted by a courier. The courier may manually input an express number to be delivered or select an express number to be delivered from a list of express numbers. The terminal device positions the current location through a tool such as a built-in GPS (Global Positioning System) and/or WIFI to obtain current address information, for example, Building 3, Yard 2, Ring 1 to Ring 2 Gymnasium West Road, Chongwen District, Beijing. The terminal device acquires an electronic signature picture including delivery address information (e.g., No. 1, Ring 1 to Ring 2 Gymnasium West Road, Chongwen District, Beijing) stored in the terminal device, or acquires the electronic signature picture including delivery address information from an electronic signature picture server (e.g., the server shown in FIG. 1) via a wired or wireless connection.

Step 202, the current address information is converted into first latitude and longitude data, and the delivery address information is converted into second latitude and longitude data.

In this embodiment, the current address information may be converted into first latitude and longitude data, and the delivery address information is converted into second latitude and longitude data through a Geographic Information System (GIS). For example, the current address information "Building 3, Yard 2, Ring 1 to Ring 2 Gymnasium West Road, Chongwen District, Beijing" is converted into first latitude and longitude data (39.886850, 116.423500). The delivery address information "No. 1, Ring 1 to Ring 2 Gymnasium West Road, Chongwen District, Beijing" is converted into second latitude and longitude data (39.930220, 116.443500).

Step 203, the distance between a geographical location corresponding to the current address information and a geographical location corresponding to the delivery address 23 information is determined based on the first longitude and latitude data and the second longitude and latitude data.

In this embodiment, the distance between the current address and the delivery address may be calculated based on the latitudes and longitudes on a latitude and longitude map. Intervals of 1° latitude are equal across the globe (because all longitude lines have the same length), approximately 111 km/1°. The longitude 1° on the equator corresponds to an arc length of approximately 111 km on the ground. Since each latitude line decreases from the equator to the two poles, and the length on the 600 latitude line is half of that on the equator, the arc lengths with a longitude difference of 1° on each latitude line are not equal. On the same latitude line (assuming that the latitude of this latitude line is α), the actual arc length corresponding to the longitude 1° is about 111 cos α km. Thus, as long as the latitude difference between any two places or the longitude difference between any two places on the equator is known, the actual distance between the two places can be calculated.

Step 204, if the distance is greater than a pre-set threshold, a first verification code is sent to a terminal of a user who is to receive goods, and a second verification code inputted by the user based on the first verification code is received.

In this embodiment, if the distance is greater than a pre-set threshold, for example, 200 meters, it indicates that the signing location is far from the delivery address on the electronic signature picture, at this time, a first verification code needs to be sent to a terminal of a user who is to receive goods for verification, and the user inputs a second verification code to the terminal device based on the received first verification code. The terminal device performs matching verification on the received second verification code and the 2 previously sent first verification code.

Step 205, in response to determining that the second verification code is consistent with the first verification code, signature data inputted by the user on the electronic signature picture is received.

In this embodiment, if the identity of the user passes the verification, it is indicated that the signer is the consignee himself, then signature data inputted by the user on the electronic signature picture can be received.

In some optional implementations of this embodiment, if the distance is smaller than or equal to the pre-set threshold, signature data inputted by the user who is to receive goods on the electronic signature picture is received. At this time, the signing location is consistent with or near the delivery address on the electronic signature picture, which may prove that the courier does arrive at the delivery location, and no random others' signing instead of the customer exists.

In some optional implementations of this embodiment, the method further includes: replacing the delivery address information and the consignee's phone number on the electronic signature picture including the signature data with preset characters. For example, part of the address information and the consignee's phone number are replaced with "*", such as the reception phone "136**1234", the delivery address "College Building A*, Haidian District, Beijing".

Figure 3:
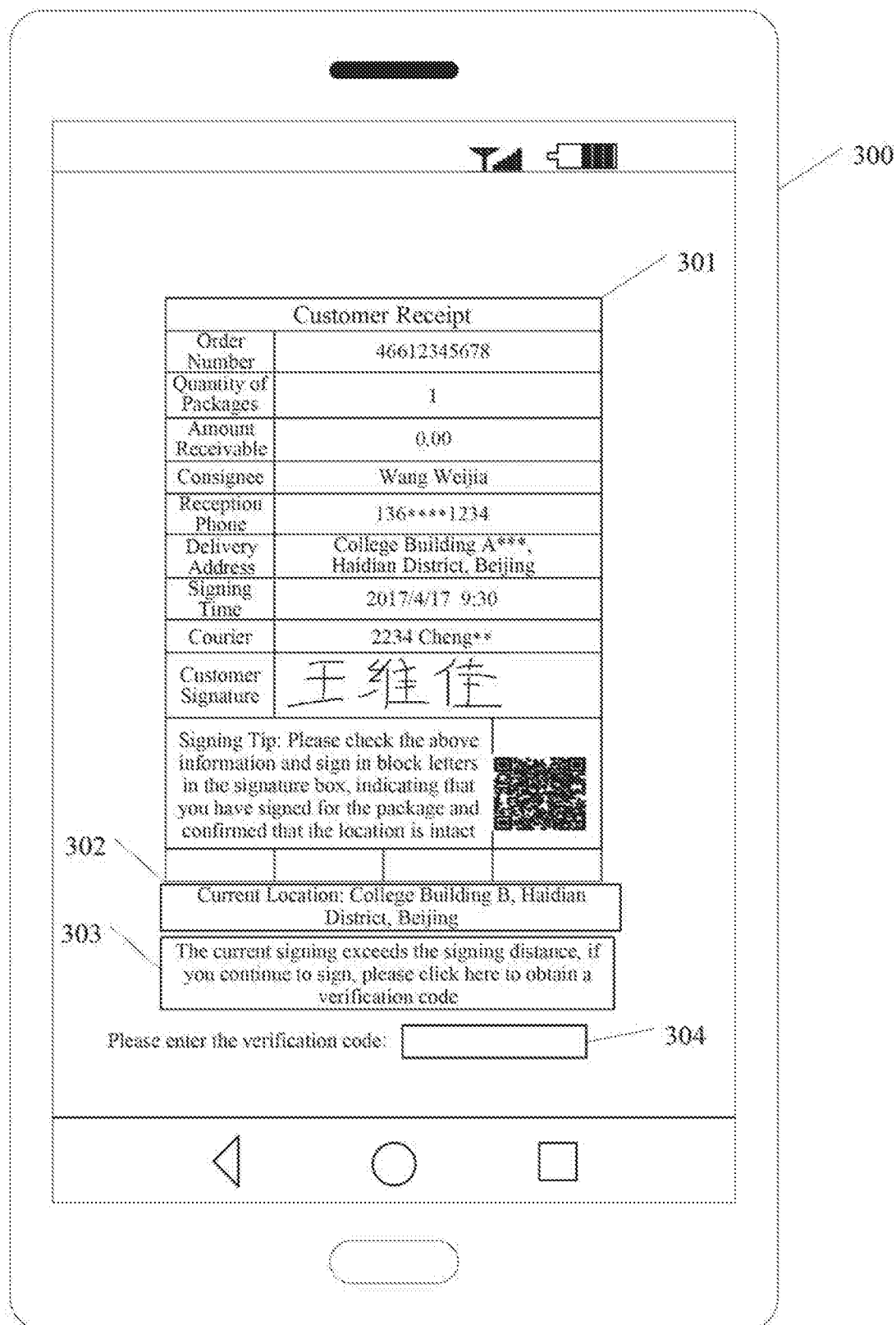
FIG. 3 is a schematic diagram of an application scenario of the electronic signing method according to the present disclosure.

Further referring to FIG. 3, a schematic diagram of an application scenario of the electronic signing method according to this embodiment is shown. In the application scenario of FIG. 3, before a courier delivers an express to a consignee, a signing request button may be clicked on a delivery terminal 300. At this time, the delivery terminal 300 displays a to-be-signed electronic signature picture 301 and current address information 302. If the distance between the current address and the delivery address on the electronic signature picture is more than 200 meters, the delivery terminal displays prompt information 303 "The current signing exceeds the signing distance, if you continue to sign, please click here to obtain a verification code". If the user clicks 303, the delivery terminal sends a verification code to the terminal of the user. The user inputs the received verification code to an input box 304 for verification. If the verification succeeds, the user can sign on the electronic signature picture 301. The delivery terminal 300 can store the signed electronic signature picture, and can also send the electronic signature picture to a target server for centralized storage.

According to the method provided by the above embodiment of the present disclosure, the current address information of the user who is to receive goods and the delivery address information are verified to prevent other unauthorized user from signing instead of the user who is to receive goods. The signed electronic signature picture is quickly and conveniently saved for subsequent archiving and query.

Figure 4:
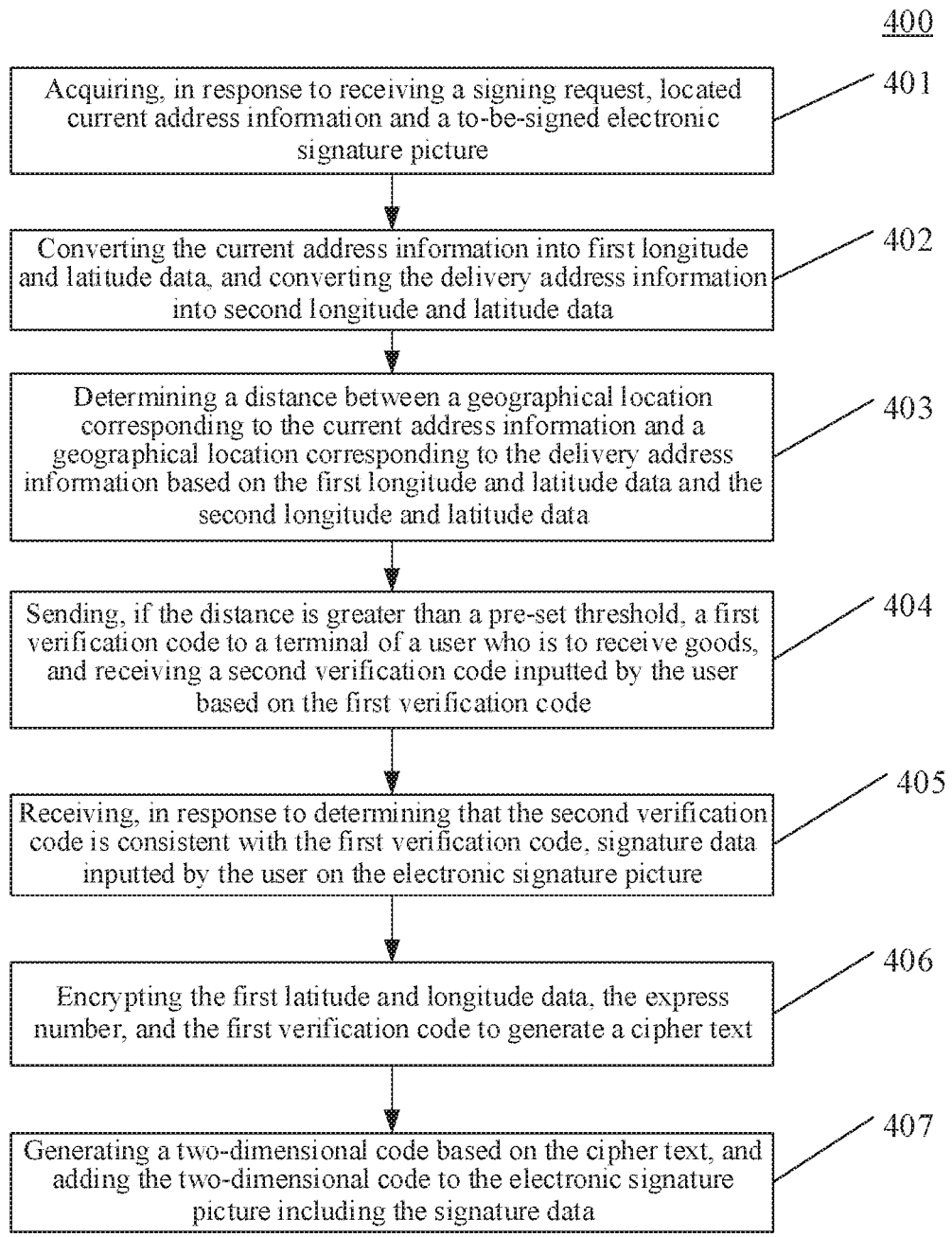
FIG. 4 is a flowchart of another embodiment of the electronic signing method according to the present disclosure.

Further referring to FIG. 4, a process 400 of another embodiment of the electronic signing method is shown. The process 400 of the electronic signing method includes the following steps.

Step 401, in response to receiving a signing request, located current address information and a to-be-signed electronic signature picture are acquired.

Step 402, the current address information is converted into first latitude and longitude data, and the delivery address information is converted into second latitude and longitude data.

Step 403, the distance between a geographical location corresponding to the current address information and a geographical location corresponding to the delivery address information is determined based on the first longitude and latitude data and the second longitude and latitude data.

Step 404, if the distance is greater than a pre-set threshold, a first verification code is sent to a terminal of a user who is to receive goods, and a second verification code inputted by the user based on the first verification code is received.

Step 405, in response to determining that the second verification code is consistent with the first verification code, signature data inputted by the user on the electronic signature picture is received.

Steps 401-405 are substantially the same as steps 201-205, and therefore will not be described again.

Step 406, the first latitude and longitude data, the express number, and the first verification code are encrypted to generate a cipher text.

In this embodiment, the first latitude and longitude data, the express number, and the first verification code are encrypted through a matrix encryption algorithm to generate a cipher text.

In some optional implementations of this embodiment, the first latitude and longitude data and the express number are encrypted through a matrix encryption algorithm to generate a cipher text.

In some optional implementations of this embodiment, the first latitude and longitude data and the express number are encrypted by using the first verification code as a key to generate a cipher text.

Step 407, a two-dimensional code is generated based on the cipher text, and the two-dimensional code is added to the electronic signature picture including the signature data.

In this embodiment, a two-dimensional code is generated based on the cipher text generated in step 406, and the two-dimensional code is added to the electronic signature picture including the signature data, as shown in the lower right corner of FIG. 3.

In some optional implementations of this embodiment, the method further includes: in response to receiving a query request, acquiring the electronic signature picture including the two-dimensional code; scanning the two-dimensional code to obtain the cipher text, parsing the first latitude and longitude data, the express number, and the first verification code from the cipher text, converting the first latitude and longitude data into the current address information, and then outputting the current 23 address information, the express number, and the first verification code. When the customer questions the signature of the order, the electronic signature picture may be called for parsing. The terminal device for parsing may be installed with specific application software or public number. The terminal device scans the two-dimensional code to call a GIS service, and parses the first latitude and longitude data and the current address corresponding to the first latitude and longitude data through a decryption matrix. For example, the parsed first latitude and longitude data is (39.886850, 116.423500), and the first latitude and longitude data is converted into a real signing address "Building 3, Yard 2, West Road". Hence, the signing location is true and traceable, and the behavior of signing instead of the customer is effectively prevented. A valid signing evidence is provided in the event of a dispute on the order.

In some optional implementations of this embodiment, before parsing the first latitude and longitude data, the express number, and the first verification code from the cipher text, the method further includes: sending a third verification code to the terminal of the user; receiving a fourth verification code inputted by the user based on the third verification code; determining whether the fourth verification code is consistent with the third verification code; and if consistent, parsing the first latitude and longitude data, the express number, and the first verification code from the cipher text. When the customer questions the signature of the order, the electronic signature picture may be called for parsing. The terminal device for parsing may be installed with specific application software or public number. A short message verification service is triggered when the terminal device scans the two-dimensional code. The terminal device sends a decryption short message verification code to the mobile phone of the customer. If the verification code is wrong, the address cannot be decrypted, thereby effectively protecting sensitive information of the customer. When the correct verification code is inputted, the verification succeeds, and the GIS service is called to parse the first latitude and longitude data and the current address corresponding to the first latitude and longitude data through a decryption matrix. For example, the parsed first latitude and longitude data is (39.886850, 116.423500), and the first latitude and longitude data is converted into a real signing address "Building 3, Yard 2, West Road". Hence, the signing location is true and traceable, and the behavior of signing instead of the customer is effectively prevented. A valid signing evidence is provided in the event of a dispute on the order.

In some optional implementations of this embodiment, a fifth verification code inputted by the user based on the first verification code is received; and the first latitude and longitude data, the express number, and the first verification code are parsed from the cipher text by using the fifth verification code as a decryption key. If the input of the user is wrong, the decryption fails. In this way, the process of sending the verification code again is reduced, and the cost is lowered. The last verification code is still used to keep the consignee's information confidential more strictly.

It may be seen from FIG. 4 that, compared with the corresponding embodiment of FIG. 2, the process 400 of the electronic signing method in this embodiment highlights the step of hiding the consignee's information. Thus, the scheme described in this embodiment can quickly and effectively prevent the consignee's information from leaking.

Figure 5:
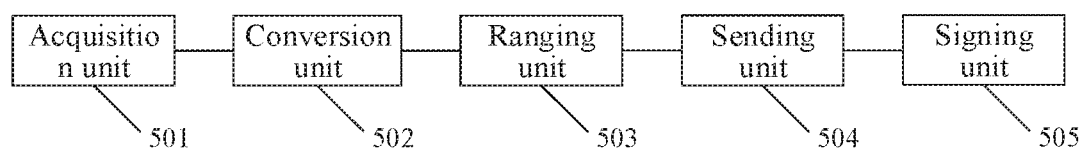
FIG. 5 is a schematic structural diagram of an embodiment of an electronic signing apparatus according to the present disclosure.

Further referring to FIG. 5, as an implementation of the method shown in the above figures, the present disclosure provides an embodiment of an electronic signing apparatus, the embodiment of the apparatus corresponds to the embodiment of the method shown in FIG. 2, and the apparatus can be specifically applied to various electronic devices.

As shown in FIG. 5, the electronic signing apparatus 500 of this embodiment includes an acquisition unit 501, a conversion unit 502, a ranging unit 503, a sending unit 504, and a signing unit 505. The acquisition unit 501 is configured to acquire, in response to receiving a signing request, the located current address information and a to-be-signed electronic signature picture, where the electronic signature picture includes delivery address information; the conversion unit 502 is configured to convert the current address information into first longitude and latitude data, and convert the delivery address information into second longitude and latitude data; the ranging unit 503 is configured to determine a distance between a geographical location corresponding to the current address information and a geographical location corresponding to the delivery address information based on the first longitude and latitude data and the second longitude and latitude data; the sending unit 504 is configured to send, if the distance is greater than a pre-set threshold, a first verification code to a terminal of a user who is to receive goods, and receive a second verification code inputted by the user based on the first verification code; and the signing unit 505 is configured to receive, in response to determining that the second verification code is consistent with the first verification code, signature data inputted by the user on the electronic signature picture.

In this embodiment, for the specific processing of the acquisition unit 501, the conversion unit 502, the ranging unit 503, the sending unit 504, and the signing unit 505, reference may be made to step 201, step 202, step 203, step 204, and step 205 in the corresponding embodiment of FIG. 2.

In some optional implementations of this embodiment, the electronic signature picture further includes an express number; and the apparatus 500 further includes: an encryption unit, configured to encrypt the first latitude and longitude data, the express number, and the first verification code to generate a cipher text; and a generation unit, configured to generate a two-dimensional code based on the cipher text, and add the two-dimensional code to the electronic signature picture including the signature data.

In some optional implementations of this embodiment, the signing unit 505 is further configured to: receive, if the distance is smaller than or equal to the pre-set threshold, signature data inputted by the user who is to receive goods on the electronic signature picture.

In some optional implementations of this embodiment, the electronic signature picture further includes an express number; and the apparatus 500 further includes: an encryption unit, configured to encrypt the first latitude and longitude data and the express number to generate a cipher text; and a generation unit, configured to generate a two-dimensional code based on the cipher text, and add the two-dimensional code to the electronic signature picture including the signature data.

In some optional implementations of this embodiment, the apparatus 500 further includes: a query unit, configured to acquire, in response to receiving a query request, the electronic signature picture including the two-dimensional code; a parsing unit, configured to scan the two-dimensional code to obtain the cipher text, parse the first latitude and longitude data, the express number, and the first verification code from the cipher text, convert the first latitude and longitude data into the current address information, and then output the current address information, the express number, and the first verification code.

In some optional implementations of this embodiment, the sending unit 504 is further configured to send a third verification code to the terminal of the user before the first latitude and longitude data, the express number, and the first verification code are parsed from the cipher text; and the parsing unit is further configured to receive a fourth verification code inputted by the user based on the third verification code, determine whether the fourth verification code is consistent with the third verification code, and parse, if the fourth verification code is consistent with the third verification code, the first latitude and longitude data, the express number, and the first verification code from the cipher text.

In some optional implementations of this embodiment, the apparatus 500 further includes: a replacement unit, configured to replace the delivery address information and the consignee's phone number on the electronic signature picture including the signature data with preset characters.

In some optional implementations of this embodiment, the encryption unit is further configured to: encrypt the first latitude and longitude data and the express number by using the first verification code as a key to generate the cipher text.

In some optional implementations of this embodiment, the parsing unit is further configured to: receive a fifth verification code inputted by the user based on the first verification code; and parse the first latitude and longitude data, the express number, and the first verification code from the cipher text by using the fifth verification code as a decryption key.

Figure 6:
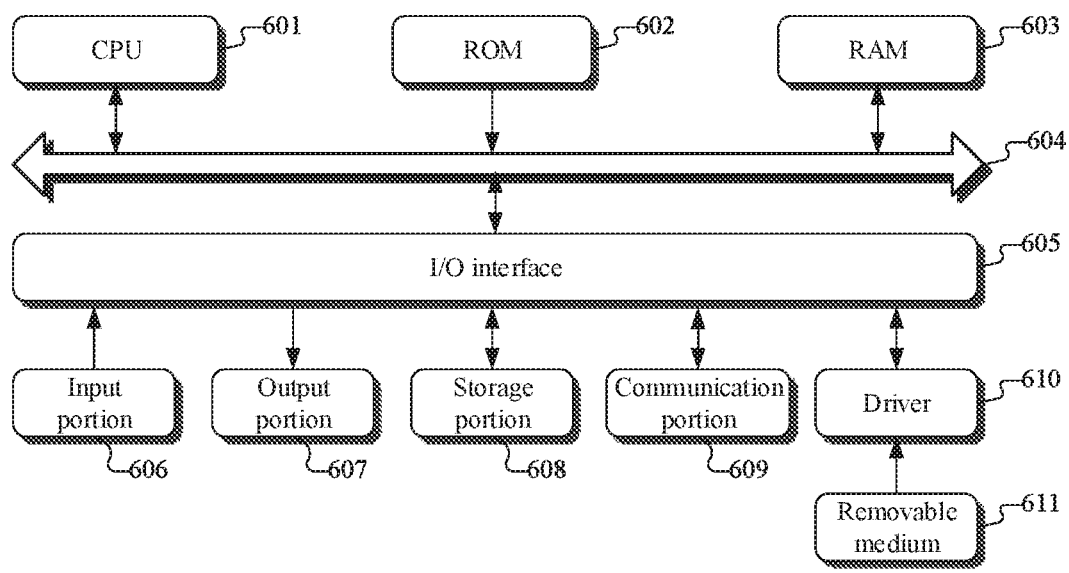
FIG. 6 is a schematic structural diagram of a computer system adapted to implement a terminal device of the embodiments of the present disclosure.

Referring to FIG. 6 below, a schematic structural diagram of a computer system 600 adapted to implement a terminal device of the embodiments of the present disclosure. The terminal device shown in FIG. 6 is merely an example, and should not limit the functions and scope of use of the embodiments of the present disclosure.

As shown in FIG. 6, the computer system 600 includes a central processing unit (CPU) 601, which may execute various appropriate actions and processes in accordance with a program stored in a read only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following portions are connected to the I/O interface 605: an input portion 606 including a keyboard, a mouse, a touch screen, a writing pad, etc.; an output portion 607 including a liquid crystal display (LCD), a loudspeaker, etc.; a storage portion 608 including a hard disk or the like; and a communication portion 609 including a network interface card such as an LAN card and a modem. The communication portion 609 executes communication processing through a network such as Internet. A driver 610 is also connected to the I/O interface 1005 as needed. A removable medium 611, such as a magnetic disk, an optical disk, a magneto-optical disk or a semiconductor memory, is installed on the driver 610 as needed, so that a computer program read therefrom is installed in the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a computer readable medium. The computer program includes program codes for executing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above functions as defined by the method of the present disclosure. It should be noted that the computer readable medium may be a computer readable signal medium or a computer readable storage medium or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In the present disclosure, the computer readable storage medium may be any tangible medium containing or storing programs, which may be used by, or used in combination with, a command execution system, apparatus or element. In the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logical functions. It should be further noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor, for example, described as: a processor, including an acquisition unit, a conversion unit, a ranging unit, a sending unit, and a signing unit. The names of these units do not constitute a limitation to such units themselves in some cases, for example, the acquisition unit may also be described as "a unit configured to acquire, in response to receiving a signing request, the located current address information and a to-be-signed electronic signature picture."

As another aspect, the present disclosure further provides a computer readable medium. The computer readable medium may be included in the apparatus described in the above embodiments, or a stand-alone computer readable medium without being assembled into the apparatus. The computer readable medium stores one or more programs, when the one or more programs are executed by the apparatus, causing the apparatus to: in response to receiving a signing request, acquire the located current address information and a to-be-signed electronic signature picture, where the electronic signature picture includes delivery address information; convert the current address information into first longitude and latitude data, and convert the delivery address information into second longitude and latitude data; determine the distance between the current address information and the delivery address information based on the first longitude and latitude data and the second longitude and latitude data; if the distance is greater than a pre-set threshold, send a first verification code to a terminal of a user who is to receive goods, and receive a second verification code inputted by the user based on the first verification code; and in response to determining that the second verification code is consistent with the first verification code, receive signature data inputted by the user on the electronic signature picture.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. An electronic signing method, comprising:
   acquiring, in response to receiving a signing request, located current address information and a to-be-signed electronic signature picture, the electronic signature picture comprising delivery address information;
   converting the current address information into first longitude and latitude data, and converting the delivery address information into second longitude and latitude data;
   determining a distance between a geographical location corresponding to the current address information and a geographical location corresponding to the delivery address information based on the first longitude and latitude data and the second longitude and latitude data;
   sending, if the distance is greater than a pre-set threshold, a first verification code to a terminal of a user who is to receive goods, and receiving a second verification code inputted by the user based on the first verification code;
   receiving, in response to determining that the second verification code is consistent with the first verification code, signature data inputted by the user on the electronic signature picture, wherein the electronic signature picture further comprises an express number;
   encrypting the first latitude and longitude data, the express number, and the first verification code to generate a cipher text; and
   generating a two-dimensional code based on the cipher text, and adding the two-dimensional code to the electronic signature picture comprising the signature data.

2. The method according to claim 1, further comprising:
   receiving, if the distance is smaller than or equal to the pre-set threshold, signature data inputted by the user who is to receive goods on the electronic signature picture.

3. The method according to claim 2, wherein the electronic signature picture further comprises an express number, and
   the method further comprises:
   encrypting the first latitude and longitude data and the express number to generate a cipher text;
   generating a two-dimensional code based on the cipher text, and adding the two-dimensional code to the electronic signature picture comprising the signature data.

4. The method according to claim 1, further comprising:
   acquiring, in response to receiving a query request, the electronic signature picture comprising the two-dimensional code;
   scanning the two-dimensional code to obtain the cipher text, parsing the first latitude and longitude data, the express number, and the first verification code from the cipher text, converting the first latitude and longitude data into the current address information, and then outputting the current address information, the express number, and the first verification code.

5. The method according to claim 4, wherein before parsing the first latitude and longitude data, the express number, and the first verification code from the cipher text, the method further comprises:
   sending a third verification code to the terminal of the user;
   receiving a fourth verification code inputted by the user based on the third verification code;
   determining whether the fourth verification code is consistent with the third verification code; and
   parsing, if the fourth verification code is consistent with the third verification code, the first latitude and longitude data, the express number, and the first verification code from the cipher text.

6. The method according to claim 4, wherein the encrypting the first latitude and longitude data, the express number, and the first verification code to generate a cipher text comprises:
   encrypting the first latitude and longitude data and the express number by using the first verification code as a key to generate the cipher text.

7. The method according to claim 6, wherein the parsing the first latitude and longitude data, the express number, and the first verification code from the cipher text comprises:
   receiving a fifth verification code inputted by the user based on the first verification code; and
   parsing the first latitude and longitude data, the express number, and the first verification code from the cipher text by using the fifth verification code as a decryption key.

8. The method according to claim 1, further comprising:
   replacing the delivery address information and a consignee's phone number on the electronic signature picture comprising the signature data with preset characters.

9. An electronic signing apparatus, comprising:
   at least one processor; and
   a memory storing instructions, the instructions when executed by the at least one processor, cause the at least one processor to perform operations, the operations comprising:
   acquiring, in response to receiving a signing request, located current address information and a to-be-signed electronic signature picture, the electronic signature picture comprising delivery address information;
   converting the current address information into first longitude and latitude data, and convert the delivery address information into second longitude and latitude data;
   determining a distance between a geographical location corresponding to the current address information and a geographical location corresponding to the delivery address information based on the first longitude and latitude data and the second longitude and latitude data;
   sending, if the distance is greater than a pre-set threshold, a first verification code to a terminal of a user who is to receive goods, and receive a second verification code inputted by the user based on the first verification code;
   receiving, in response to determining that the second verification code is consistent with the first verification code, signature data inputted by the user on the electronic signature picture, wherein the electronic signature picture further comprises an express number;
   encrypting the first latitude and longitude data, the express number, and the first verification code to generate a cipher text; and generating a two-dimensional code based on the cipher text, and add the two-dimensional code to the electronic signature picture comprising the signature data.

10. The apparatus according to claim 9, wherein the operations further comprise:
receiving, if the distance is smaller than or equal to the pre-set threshold, signature data inputted by the user who is to receive goods on the electronic signature picture.

11. The apparatus according to claim 10, wherein the electronic signature picture further comprises an express number, and
the operations further comprise:
encrypting the first latitude and longitude data and the express number to generate a cipher text; and
generating a two-dimensional code based on the cipher text, and add the two-dimensional code to the electronic signature picture comprising the signature data.

12. The apparatus according to claim 9, the operations further comprising:
acquiring, in response to receiving a query request, the electronic signature picture comprising the two-dimensional code; and
scanning the two-dimensional code to obtain the cipher text, parsing the first latitude and longitude data, the express number, and the first verification code from the cipher text, converting the first latitude and longitude data into the current address information, and then outputting the current address information, the express number, and the first verification code.

13. The apparatus according to claim 12, wherein before parsing the first latitude and longitude data, the express number, and the first verification code from the cipher text, the operations further comprise:
sending a third verification code to the terminal of the user; and
the parsing unit is further configured to receiving a fourth verification code inputted by the user based on the third verification code, determining whether the fourth verification code is consistent with the third verification code, and parsing, if the fourth verification code is consistent with the third verification code, the first latitude and longitude data, the express number, and the first verification code from the cipher text.

14. The apparatus according to claim 12, wherein the encrypting the first latitude and longitude data, the express number, and the first verification code to generate a cipher text comprises:
encrypting the first latitude and longitude data and the express number by using the first verification code as a key to generate the cipher text.

15. The apparatus according to claim 14, wherein the parsing the first latitude and longitude data, the express number, and the first verification code from the cipher text comprises:
receiving a fifth verification code inputted by the user based on the first verification code; and
parsing the first latitude and longitude data, the express number, and the first verification code from the cipher text by using the fifth verification code as a decryption key.

16. The apparatus according to claim 9, the operations further comprising:
replacing the delivery address information and the consignee's phone number on the electronic signature picture comprising the signature data with preset characters.

17. A non-transitory computer readable storage medium, storing a computer program thereon, wherein the computer program, when executed by a processor, causes the processor to perform operations, the operations comprising:
acquiring, in response to receiving a signing request, located current address information and a to-be-signed electronic signature picture, the electronic signature picture comprising delivery address information;
converting the current address information into first longitude and latitude data, and converting the delivery address information into second longitude and latitude data;
determining a distance between a geographical location corresponding to the current address information and a geographical location corresponding to the delivery address information based on the first longitude and latitude data and the second longitude and latitude data;
sending, if the distance is greater than a pre-set threshold, a first verification code to a terminal of a user who is to receive goods, and receiving a second verification code inputted by the user based on the first verification code;
receiving, in response to determining that the second verification code is consistent with the first verification code, signature data inputted by the user on the electronic signature picture, wherein the electronic signature picture further comprises an express number;
encrypting the first latitude and longitude data, the express number, and the first verification code to generate a cipher text; and
generating a two-dimensional code based on the cipher text, and add the two-dimensional code to the electronic signature picture comprising the signature data.

* * * * *